(12) United States Patent
Quinlan et al.

(10) Patent No.: US 11,611,210 B2
(45) Date of Patent: Mar. 21, 2023

(54) TIE SWITCH RESTORATION

(71) Applicant: S&C Electric Company, Chicago, IL (US)

(72) Inventors: Michael Quinlan, Chicago, IL (US); Alejandro Montenegro, Chicago, IL (US); Yoav Sharon, Chicago, IL (US)

(73) Assignee: S&C Electric Company, Chicago, IL (US)

( * ) Notice: Subject to any disclaimer, the term of this patent is extended or adjusted under 35 U.S.C. 154(b) by 0 days.

(21) Appl. No.: 16/786,864

(22) Filed: Feb. 10, 2020

(65) Prior Publication Data
US 2021/0036508 A1 Feb. 4, 2021

Related U.S. Application Data

(60) Provisional application No. 62/804,295, filed on Feb. 12, 2019.

(51) Int. Cl.
*H02J 13/00* (2006.01)
*G05B 19/042* (2006.01)
*H02H 7/26* (2006.01)
*H02H 1/00* (2006.01)

(52) U.S. Cl.
CPC ............ *H02H 7/262* (2013.01); *G05B 19/042* (2013.01); *H02H 1/0092* (2013.01);
(Continued)

(58) Field of Classification Search
CPC ................ H02J 3/0073; H02J 13/0004; H02J 13/00002; H02J 13/00004; H02J 13/00;
(Continued)

(56) References Cited

U.S. PATENT DOCUMENTS 7,751,166 B2 7/2010 Stoupis et al.
8,525,522 B2 9/2013 Gong et al.
(Continued)

OTHER PUBLICATIONS

International Search Report and Written Opinion for International Application No. PCT/US2020/017603 dated May 18, 2020. (8 pages).

(Continued)

*Primary Examiner* — Darrin D Dunn

(57) ABSTRACT

A control system and method for a group of interconnected feeders which enables fault location, isolation and service restoration without requiring each switch to have topology knowledge of devices in adjacent feeders. The method defines, for each switch, connectivity and X/Y directional information about its neighboring switches and propagates this information throughout each feeder. A leader device is also determined for each feeder. Information about topology of adjacent feeders is not needed by all devices. Only normally-open tie switches which define a boundary between two adjacent feeders have knowledge of the devices in both feeders. Switches which open during fault isolation automatically find open tie switches in a direction opposite the fault, and request service restoration downstream of the fault by providing power from an adjacent feeder. Leader devices ensure an overload condition is not created before initiating opening and closing operations of switches downstream of the fault.

20 Claims, 7 Drawing Sheets

(52) U.S. Cl.
CPC .... *H02J 13/00004* (2020.01); *H02J 13/0004* (2020.01); *G05B 2219/2639* (2013.01)

(58) Field of Classification Search
CPC .. H02J 3/38; H02J 13/00034; H02J 13/00006; H02J 3/0012; H02J 3/144; Y04S 10/52; Y04S 10/30; Y04S 10/20; Y04S 10/18; Y04S 20/00; Y04S 10/12; Y04S 40/124; H02H 7/262; H02H 1/0092; H02H 7/261; H02H 7/30; H02H 7/263; G05B 19/042; G05B 2219/2639; Y02E 60/00; Y02E 40/70; Y02B 90/20; G05F 1/66

See application file for complete search history.

(56) References Cited

U.S. PATENT DOCUMENTS

| | | | |
|---|---|---|---|
| 9,917,436 B2 | 3/2018 | Popescu | |
| 2009/0112375 A1* | 4/2009 | Popescu | H02J 3/381 700/292 |
| 2011/0115308 A1* | 5/2011 | Wang | H02J 13/0004 307/125 |
| 2011/0313586 A1* | 12/2011 | Popescu | H02J 13/0006 700/295 |
| 2015/0084434 A1* | 3/2015 | Mousavi | H01H 9/54 307/116 |
| 2019/0277904 A1* | 9/2019 | Fan | H02H 1/0092 |
| 2020/0259320 A1* | 8/2020 | Guo | H02H 3/006 |

OTHER PUBLICATIONS

H. F. Habib, T. Youssef, M. H. Cintuglu and O. Mohammed, "A multi-agent based technique for fault location, isolation and service restoration," 2016 IEEE Industry Applications Society Annual Meeting, Portland, OR, 2016, pp. 1-8, doi: 10.1109/IAS.2016.7731975.

* cited by examiner

TIE SWITCH RESTORATION

CROSS-REFERENCE TO RELATED APPLICATION

This application claims the benefit of priority from the U.S. Provisional Application No. 62/804,295, filed on Feb. 12, 2019, the disclosure of which is hereby expressly incorporated herein by reference for all purposes.

BACKGROUND

Field

The present disclosure relates generally to a control scheme for feeder switches on an electrical grid. More particularly, it relates to a control method and system for a group of interconnected feeders, or sections of the distribution grid, which enables fault location, isolation and service restoration without requiring all switch devices to have topology knowledge of the full system. The method defines, for each switch, information about its neighboring switches, and propagates this information throughout each feeder. A leader device is also determined for each feeder. Information about adjacent feeders is not needed by all devices. Switches which open during fault isolation automatically find open tie switches in a direction opposite the fault, and request service restoration which will result in closing some of those open ties in order to restore service downstream of the fault.

Discussion of the Related Art

An electrical power transmission/distribution network, often referred to as an electrical grid, typically includes a number of power generation plants each including a number of power generator units, such as gas turbine engines, nuclear reactors, coal-fired generators, hydro-electric dams, etc. The grid may also include wind and/or solar energy generation farms. Not only are there many different types of energy generators on the grid, but there are also many different types of loads, and the generators and loads are distributed over large geographic areas. The transmission grid carries electricity from the power plants over long distances at high voltages. The distribution grid, separated from the transmission grid by voltage-reducing substations, provides electricity to the consumers/loads.

Many portions of the distribution grid, commonly known as feeders, are interconnected in a way where each feeder has a primary source (i.e., substation) which normally powers the feeder. Ends of the feeder opposite the primary source, where the feeder connects with adjacent feeders, are bounded by normally-open tie switches which isolate one feeder from the other. These tie switches can be closed to temporarily restore power to part of one feeder downstream of an isolated fault by providing the power from the adjacent feeder. Additional switches are also typically placed along the length of a feeder, thereby creating multiple feeder sections each separated by a switch, where each feeder section typically serves multiple customers.

Control of the feeder switches has been largely automated in recent years, using a strategy known as fault location, isolation and service restoration (FLISR). FLISR applications can reduce the number of customers impacted by a fault by automatically isolating the trouble area and restoring service to remaining customers by transferring them to adjacent circuits. In addition, the fault isolation feature of the technology can help crews locate the trouble spots more quickly, resulting in shorter outage durations for the customers impacted by the faulted section.

FLISR implementations can be separated into two main categories—centralized and distributed. In centralized control, data from the switch devices is transferred to a common central location where decisions are made. Centralizing FLISR decisions at a control center enables big-picture optimization of restoration tactics, but requires real-time communication of device status throughout the system. In distributed control, decisions about service restoration are made using logic and data available in the switch devices themselves, rather than at a common control center. Distributed FLISR control does not rely on the extensive real-time communication as in centralized FLISR control, but distributed FLISR has until now required either information from only adjacent devices, leading to less-than-optimal outcome, or information from all devices in the feeder and possibly adjacent feeders, reducing reliability when this information becomes unavailable.

In view of the above, there is a need for a distributed FLISR methodology which does not require switch devices to know the topology of adjacent feeders on the distribution grid in order to provide service restoration.

SUMMARY

The present disclosure describes a control system and method for a group of interconnected feeders, or portions of the distribution grid, which enables fault location, isolation and service restoration without requiring each switch to have topology knowledge of all devices in adjacent feeders. The method defines, for each switch, connectivity and X/Y directional information about its neighboring switches and propagates this information throughout each feeder. A leader device is also determined for each feeder. Information about topology of adjacent feeders is not needed by all devices. Only normally-open tie switches which define a boundary between two adjacent feeders have knowledge of the devices in both feeders. Switches which open during fault isolation automatically find the leader switch in a direction opposite the fault, and request to restore service downstream of the fault by providing power from an adjacent feeder. The leader devices ensure an overload condition is not created before initiating device operations.

Additional features of the present disclosure will become apparent from the following description and appended claims, taken in conjunction with the accompanying drawings.

DETAILED DESCRIPTION OF THE EMBODIMENTS

Figure 1:
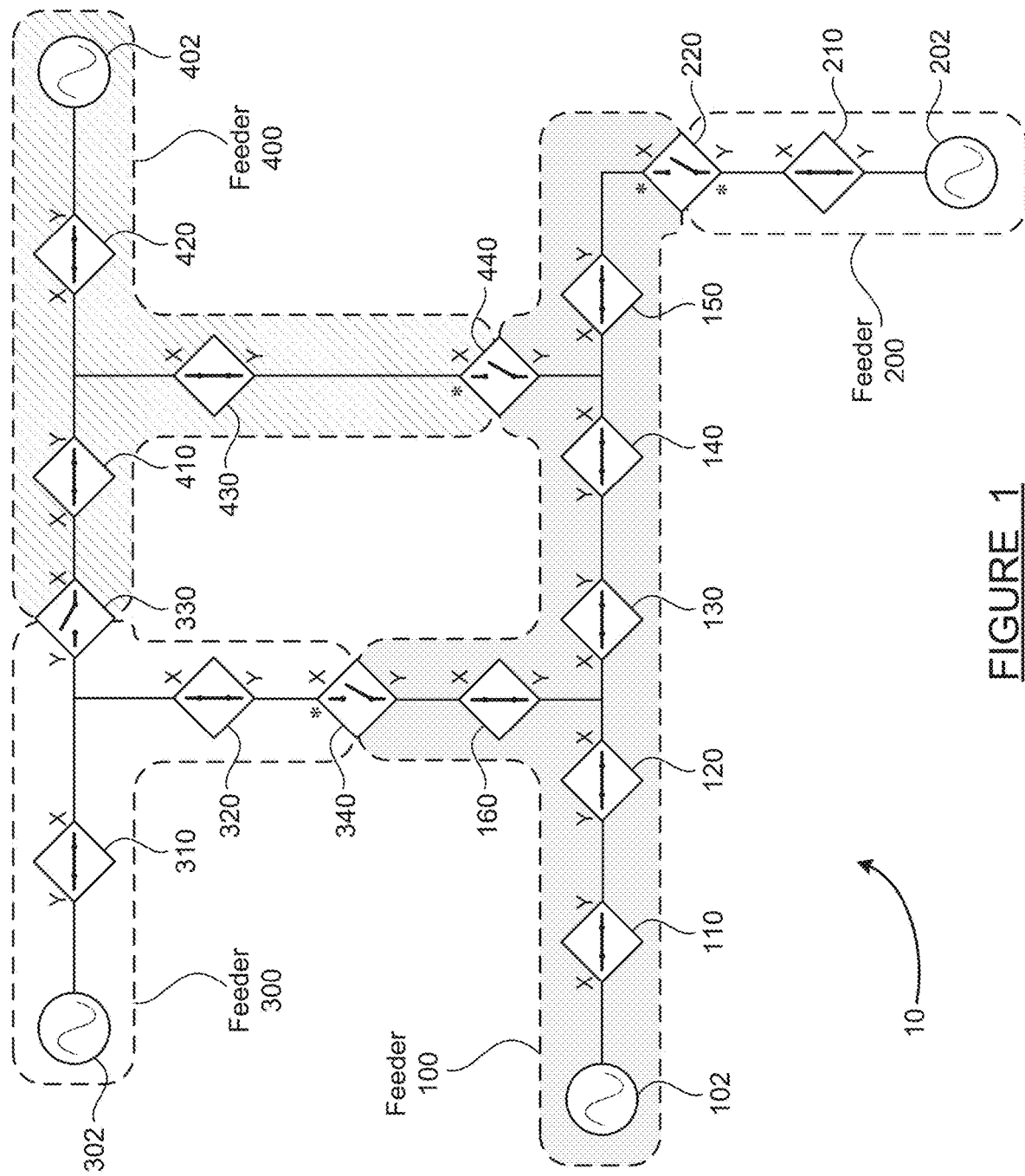
FIG. 1 is a schematic diagram of a group of interconnected feeders in a normal fault-free condition, where the connectivity of the adjacent switches is known by each switch, according to an embodiment of the present disclosure.

The following discussion of the embodiments of the disclosure directed to a technique for implementing distributed fault location, isolation and service restoration (FLISR) in a group of interconnected feeders without switch devices having knowledge of adjacent feeder topology is merely exemplary in nature, and is in no way intended to limit the disclosure or its applications or uses.

An electrical power grid consists of a transmission network and a distribution network. The transmission network handles the movement of electrical energy at high voltage over long distances from a generating site, such as a power plant, to an electrical substation. The distribution network moves electrical energy on local wiring between substations and customers. Because the distribution portion of the grid includes power lines which are susceptible to problems such as downed power poles and downed tree limbs, faults are relatively common on the distribution grid. Fault location, isolation and service restoration (FLISR) is the name given to a set of techniques used to recover from faults on the distribution grid.

The distribution grid is generally divided into units known as feeders. A feeder provides electrical energy to many end customers—including houses, businesses, factories, etc. Each feeder has a main energy source at one end and may have one or more boundaries with adjacent feeders at ends opposite the main source, where the adjacent feeders each have their own main source. The sources are typically substations, where high voltage energy (often several hundred thousand volts) on the transmission grid is transformed down to medium voltage energy (less than 40,000 volts). The main source is normally connected to and provides the power to the feeder, while the boundaries with the adjacent feeders are normally disconnected by an open tie switch. Along the length of each feeder, normally-closed switches are provided at intervals, where these normally-closed switches can be opened to isolate a fault in the feeder.

It is to be understood that the feeders described herein are three-phase networks. That is, each feeder includes three lines ($L_1$, $L_2$, $L_3$), each 120° out of phase with the others. The end customers may receive electrical service from one or more of the phases, where the houses almost always have single-phase service, and the businesses and factories may have three-phase service if they have high energy demands and/or large inductive loads such as motors. Each of the switches mentioned above is capable of opening or closing the feeder circuit for any individual phase as well as for all three phases.

If a fault occurs in a feeder, such as for example a lightning strike which damages or knocks down one or more power lines in a section between two normally-closed switches, it is possible to isolate the fault by opening the switches on each side of the fault and restore power to downstream sections by closing a tie switch to an adjacent feeder. This fault isolation and service restoration could be performed by line service crews visually locating the fault and manually opening and closing switches. A much better alternative is the use of FLISR techniques, which have resulted in fault isolation and service restoration happening automatically and very fast.

However, centralized FLISR techniques require real-time communication between the switches and a common controller, so that voltage and current measurements at each device, along with device open/closed status, can be used to command and control the status of other adjacent devices. These real-time communication-based FLISR techniques work well as long as the communication channels are operable but are completely defeated if the communication channels or the central controller are inoperable. Even with current technology, any communication medium can experience an outage—whether due to equipment failure, infrastructure damage, wireless signal interference or jamming, computer malware, or otherwise. A communication outage represents a single point of failure for centralized FLISR systems.

Distributed FLISR techniques do not require the extensive two-way communication of centralized FLISR. However, traditional distributed FLISR techniques require each switch device to have knowledge of the topology of not only their own feeder, but also adjacent feeders. This requirement for extensive system topology knowledge adds complexity to distributed FLISR implementations, is difficult to maintain accurately in the midst of fault events, and limits flexibility in responding to multiple faults. For these reasons, a new FLISR technique which relies only on the topology knowledge necessary for restoration is needed.

The present disclosure provides a technique for implementing distributed FLISR without switch devices being required to have knowledge of adjacent feeder topology. This scheme simplifies system configuration, and enables service restoration downstream of a faulted section quickly, even in the presence of other faults in adjacent feeders, while also preventing overload conditions. Preventing lengthy loss of voltage in sections downstream of a fault can avoid unwanted disconnection of important devices and can reduce the number of customers affected by the outage.

In the disclosed method, all switch devices initially determine information about their neighbor devices, including an X/Y orientation direction for each switch. This topology information is propagated to all switches within the feeder but need not be communicated to devices in adjacent feeders. Only the open tie switches which form the boundary between adjacent feeders need to have information about both feeders. When a fault occurs, conventional techniques are used to isolate the fault by opening one or more normally-closed switches. Then the switches which just opened use the topology knowledge of their feeder to find one or more open ties in a direction opposite the fault, and request restoration via closing of those ties. The actual restoration is not initiated by the ties until status of the adjacent feeder is checked and it is ascertained that overload conditions can be avoided. Thus, fault isolation and service restoration are accomplished solely based on knowledge local to each feeder and communication only within the feeder, with no need for communication to a common multi-feeder control center.

The following discussion of FIGS. 1-6 provides a detailed explanation and examples of the techniques for distributed FLISR without system-wide topology knowledge described briefly above. Throughout this discussion, it should be understood that each of the switch devices includes voltage and current measurement sensors, a controller or processor which receives the measurements from the sensors and performs the calculations and logic of the disclosed methods, and an actuator capable of opening or closing the switch (for all three phases) upon command from the controller. Each of the switch devices also includes a communication module capable of communicating with other switches within its own feeder, including the tie switches at the ends. Communication between non-adjacent devices may be accomplished by relaying messages through devices located in between.

FIG. 1 is a schematic diagram 10 of a group of interconnected feeders in a normal fault-free condition, illustrating switch connectivity information known by each switch, according to an embodiment of the present disclosure. In the example illustrated in FIG. 1, which is followed through subsequent steps in FIGS. 2-6, four adjacent feeders are shown, with interconnections as discussed above. Throughout the following discussion, the term upstream is used to mean in a direction closer to the source, while downstream means in a direction further from the source.

A feeder 100 is shown with an irregular shape outlined with a dashed line and a shaded background. The feeder 100 includes a source 102 at the left end, and normally-closed switches 110, 120, 130, 140, 150 and 160 along the length of the feeder 100. At the far-right end of the feeder 100, a tie switch 220 defines a boundary between the feeder 100 and an adjacent feeder 200. Tie switches are normally-open devices, as discussed above. The feeder 100 also includes two branch points, each of which leads to a boundary with another feeder. A tie switch 340 defines a boundary between the feeder 100 and an adjacent feeder 300, and a tie switch 440 defines a boundary between the feeder 100 and an adjacent feeder 400.

The feeder 200 includes a source 202 and a normally-closed switch 210 and terminates at the tie switch 220 at the boundary with the feeder 100. The feeder 300 includes a source 302 and normally-closed switches 310 and 320. A tie switch 330 defines a boundary between the feeder 300 and the feeder 400, and the tie switch 340 defines the boundary between the feeder 300 and the feeder 100. The feeder 400 includes a source 402, and normally-closed switches 410, 420 and 430. The tie switch 330 at the boundary with the feeder 300, and the tie switch 440 at the boundary with the feeder 100, were mentioned above.

In the disclosed restoration method, each of the switches is designated with a local X and Y direction. This X/Y directional designation is assigned to both normally-closed switches and to normally-open tie switches. The selection of the X and Y directions for each switch is arbitrary; it doesn't matter which direction is defined as X and which as Y, as long as the definition is adhered to consistently once designated. The X/Y directional designations for all of the switches are shown on FIG. 1 and subsequent figures.

A topology list for each feeder is created by propagating each switch's neighbor information throughout the entire feeder by switch-to-switch communication. For example, the switch 110 determines that it has the source 102 as its neighbor on the X side, and the switch 120 as its neighbor on the Y side. The switch 120 has the switch 110 as its neighbor on the Y side, and the switches 130 and 160 (on separate branches) as its neighbors on the X side. In this way, all of the switches in the feeder 100 have knowledge of their own connectivity, and this is shared to create a topology list for the feeder 100, including the neighbors in each (X/Y) direction for each of the switches in the feeder 100. Topology lists are similarly created for the devices in the feeders 200, 300 and 400.

The topology list is created and shared with all devices in each feeder at a time of normal operations, before a fault occurs, such as at the time when each feeder is created, or its topology is modified, or periodically to capture change in load. The fact that the topology list for each feeder only needs to be communicated to the devices in that feeder—not to the entire interconnected multi-feeder system—simplifies the operation of the disclosed method.

The tie switches which form a boundary between two adjacent feeders receive the topology list for both of the feeders which they connect. For example, the tie switch 220 receives the topology list for the feeder 100 and the feeder 200, the tie switch 340 receives the topology list for the feeder 100 and the feeder 300, etc.

Along with the topology list, an open tie "leader" must be designated for each feeder. The leader is the open tie which has the responsibility and the authority to make decisions for its feeder—in particular, authorizing closing a tie switch to connect the feeder to an adjacent feeder. The open tie leaders are designated with a * symbol, within the feeder for which the tie is the leader, on FIGS. 1-5.

The leader for each feeder may be selected based on a set of predetermined rules. A non-limiting list of examples for leader selection rules includes: selection based on switch RTU number (remote terminal unit; similar to an IP address); selection based on switch location within the feeder (where a central location may be preferable); and selection based on computing capacity or load-carrying capacity. Because the rules are pre-defined and the topology of each feeder is known for the normal operating conditions of FIG. 1, the leader is therefore also known by applying the pre-defined rules to the normal topology.

For the normal operating conditions of FIG. 1, the switch 220 is the leader for the feeder 100, as indicated by the * located above-left of the switch 220, within the outline of the feeder 100. The switch 220 is also the leader (the only open tie) for the feeder 200, as indicated by the * below-left of the switch 220. Similarly, the switch 340 is defined as the leader for the feeder 300, and the switch 440 is defined as the leader for the feeder 400.

Using the topology lists and tie leader designations as defined above and the logic of the disclosed methods, service restoration can be accomplished following a fault, as illustrated in FIGS. 2-6 and explained in the discussion below.

Figure 2:
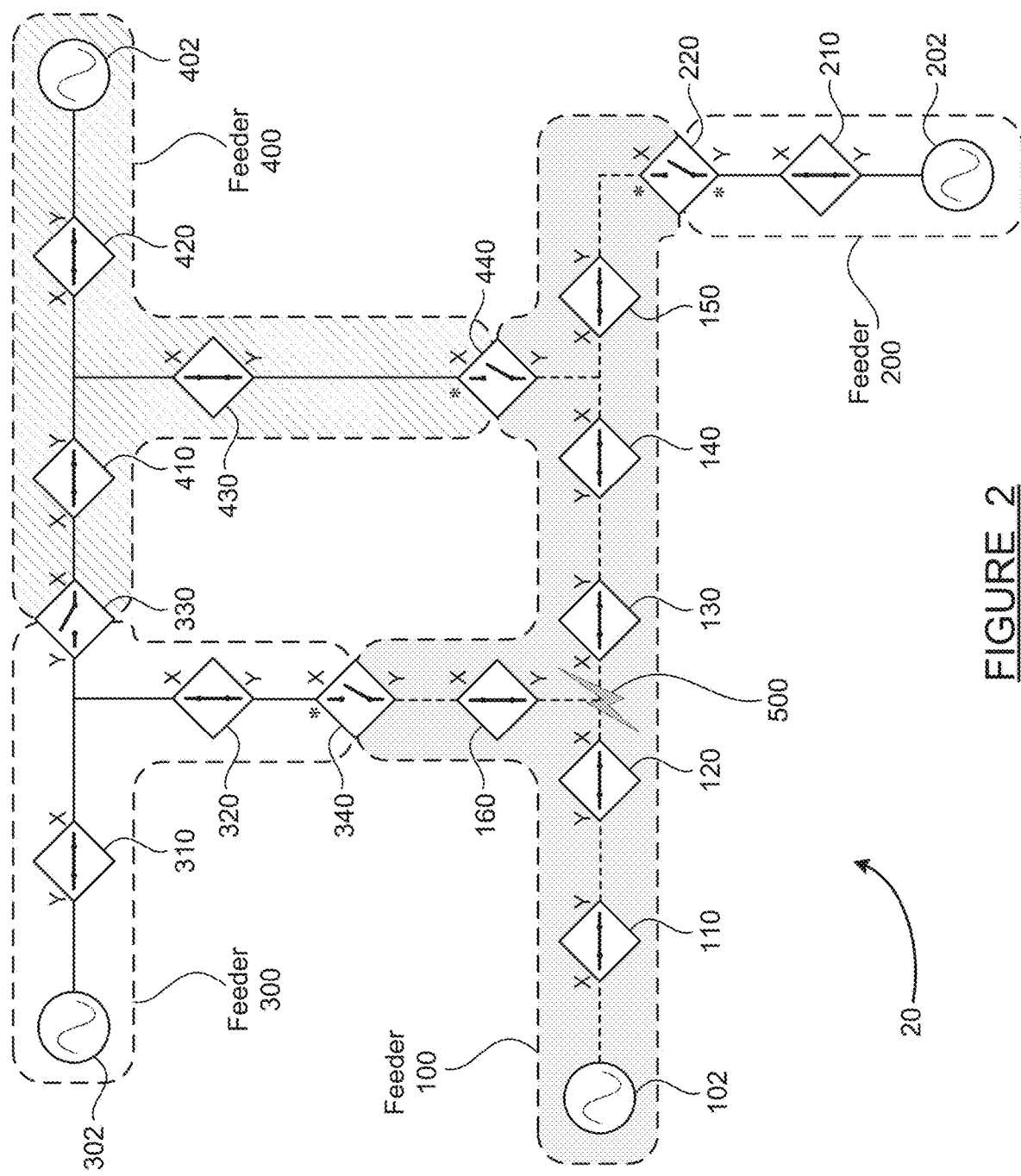
FIG. 2 is a schematic diagram of the group of interconnected feeders in a condition where a fault has just occurred, according to an embodiment of the present disclosure.

FIG. 2 is a schematic diagram 20 of the interconnected feeders 100-400 in a condition where a fault has just occurred, according to an embodiment of the present disclosure. A fault 500 is shown as occurring near the branch point between the switches 120, 130 and 160 in the feeder 100. The fault 500 may be any type of line-to-line, line-to-ground or open-circuit fault, such as a tree limb falling against one line (one phase) and either breaking that line or causing one line (phase) to contact another line, or causing a ground fault in the line.

When the fault 500 occurs, all areas of the feeder 100 will experience some kind of disturbance, as indicated by the dashed lines connecting the switches within the feeder 100. The portions of the feeder 100 which are upstream of the fault 500 (that is, nearer to the source 102)—which in this case are the switches 110 and 120—will experience a high current on at least the one phase associated with the fault 500. The portions of the feeder 100 which are downstream of the fault 500—which are the sections of the feeder 100 to the right of the switch 130 and above the switch 160—will likely experience a voltage drop or a complete loss of voltage on at least the one phase associated with the fault 500.

FIG. 2 represents the instant at which the fault 500 occurs. No changes in configuration or status of the switches have yet happened in FIG. 2. In FIGS. 3-6 which follow, any switch which has changed status from the previous figure (from open to closed, or vice versa) is shown in bold line font, in order to make it easy to see what has changed. The graphical depictions of the switches are shown appropriately in all cases, whether open or closed.

Figure 3:
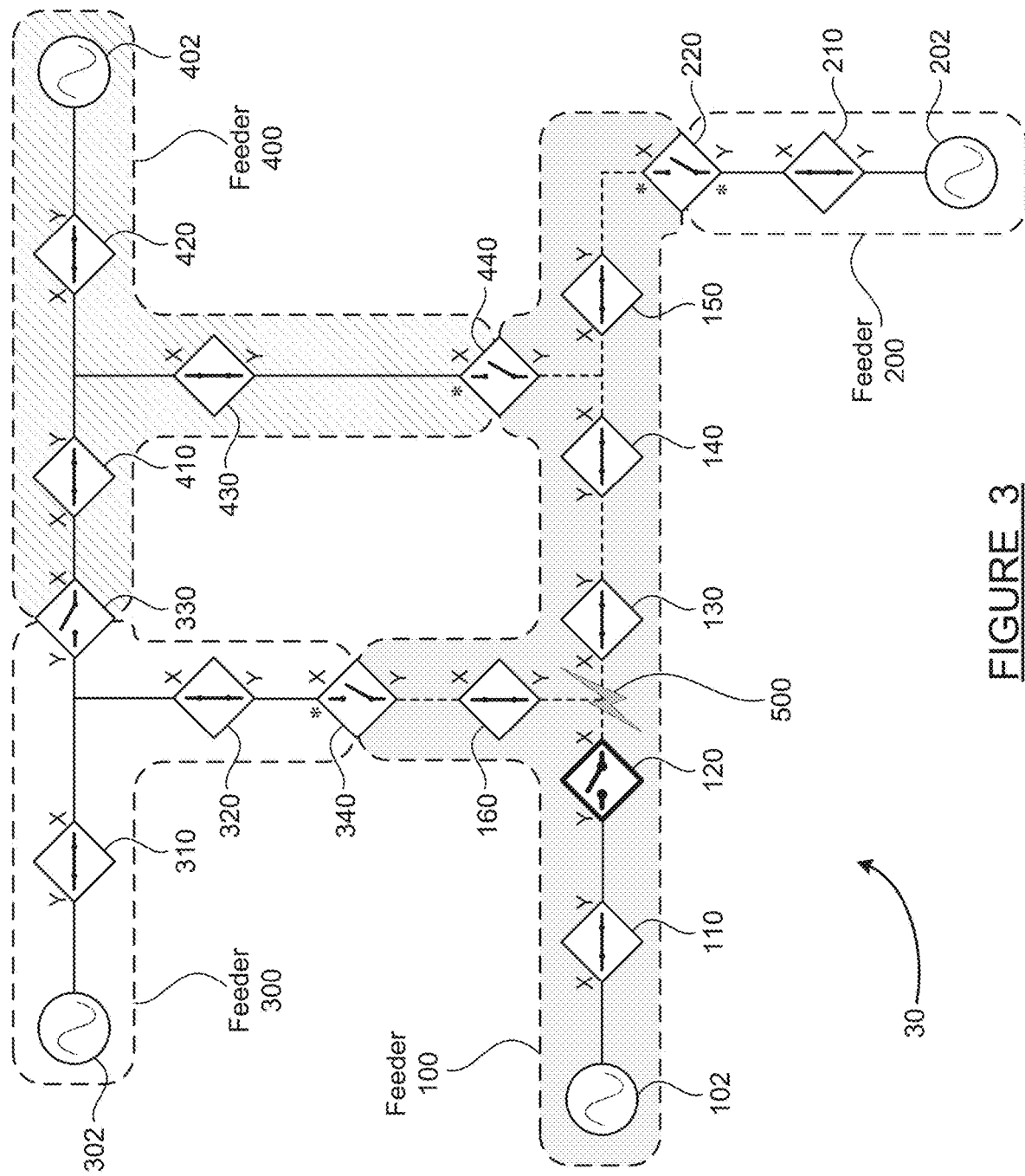
FIG. 3 is a schematic diagram of the group of interconnected feeders in a condition where a normally-closed switch has opened in response to the fault.

FIG. 3 is a schematic diagram 30 of the interconnected feeders 100-400 in a condition where a normally-closed switch has opened in response to the fault 500. When the fault 500 occurs, the switches 110 and 120 will detect an abnormally high current on at least one phase. Existing over-current protection schemes will cause the switch 120 to open to interrupt the fault and stop the abnormally high current. One example of such an existing protection scheme is where each switch is configured with time-current protection characteristics, where devices further from the source are configured to trip to an open position faster than devices which are nearer to the source. Using time-current protection characteristics in this manner and recognizing that the switches 130-160 do not experience excess current because they are not located between the source 102 and the fault 500, the switch 120 will open fastest to stop the over-current situation and isolate the fault 500 from the source 102. A switch may try to reclose into the fault several times. This allows full restoration in case of temporary or intermittent faults. After a predetermined number of reclose attempts, if the fault persists, the switch will lock out. Once a switch locks out, it will only close back upon a human-initiated command, either remotely (through SCADA for example) or locally by pulling a lever.

When the switch 120 opens as shown on FIG. 3, this action isolates the fault 500 from the portions of the feeder 100 upstream of the switch 120. Thus, as indicated by the solid line, service is now restored to customers located between the source 102 and the switch 110, and customers located between the switch 110 and the switch 120. Also, when the switch 120 opens, this action completely cuts power on all three phases to the portions of the feeder 100 downstream of the switch 120. Thus, a complete loss of voltage is experienced in the fault area between the switches 120, 130 and 160, and to the right of the switch 130, and also above the switch 160.

Figure 4:
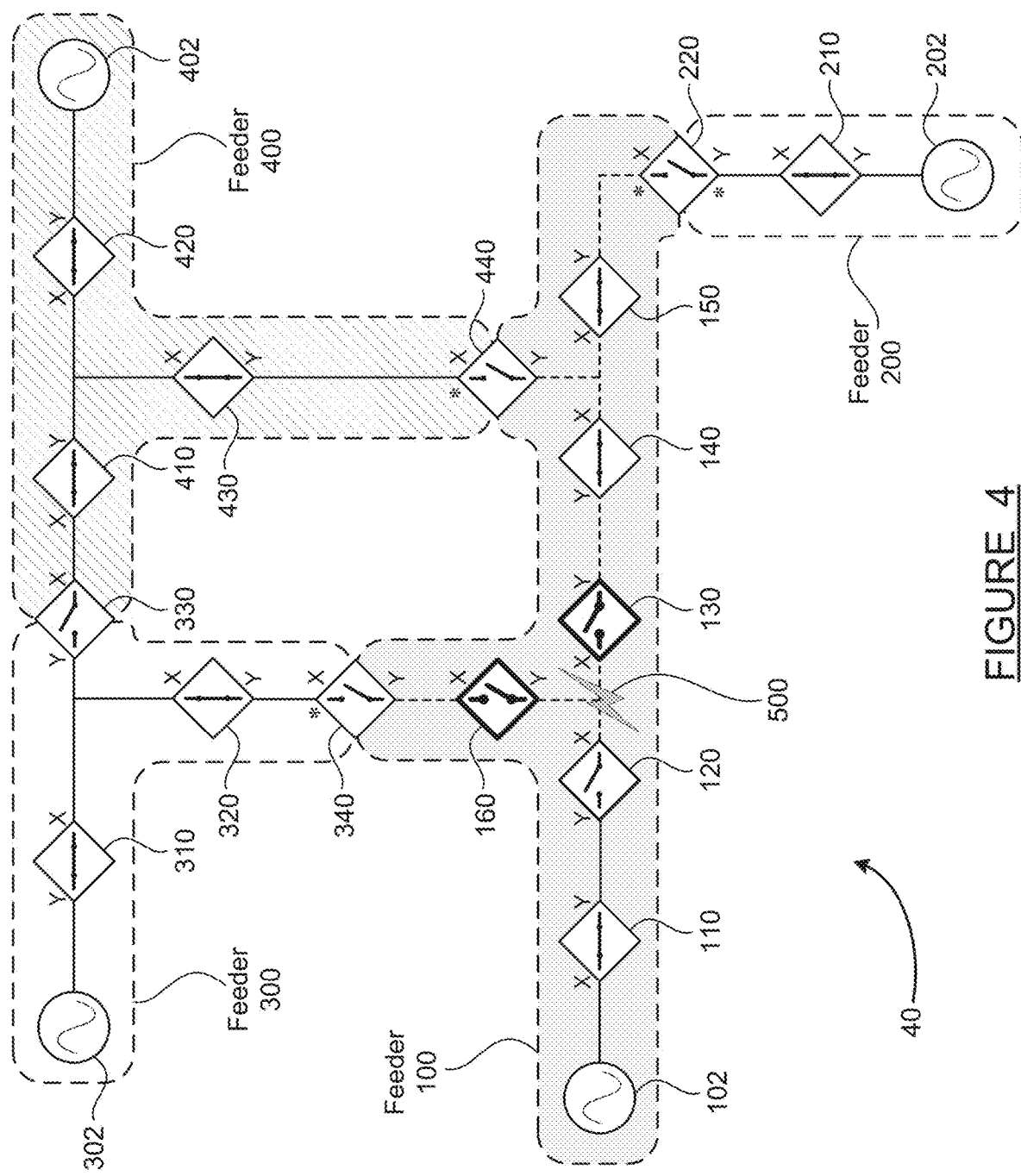
FIG. 4 is a schematic diagram of the group of interconnected feeders in a condition where two other normally-closed switches have opened in response to a total loss of voltage following the fault.

FIG. 4 is a schematic diagram 40 of the interconnected feeders 100-400 in a condition where two other normally-closed switches have opened in response to a total loss of voltage. In FIG. 4, the switches 130 and 160 have opened, and the switch 120 remains open as discussed above. This action isolates the fault 500 between the switches 120, 130 and 160. One way that the switches 130 and 160 may be configured to open and isolate the fault 500 is by passing isolating messages between the devices. In other words, when the switch 120 opens due to its time-current protection characteristics to isolate the fault 500 from the source 102, the switch 120 can send a message to its downstream neighbor(s), which it knows from its topology list, telling the downstream neighbors that they must also open in order to fully isolate the fault 500 from the source 102. Other control logic may also be used to cause the switches 130 and 160 to open upon detection of a complete voltage loss on all three phases.

With the isolating switches 120, 130 and 160 open, the fault 500 is now isolated between these switches, and power is completely cut off to all portions of the feeder 100 downstream of the isolating switches. In order to restore power to the portions of the feeder 100 to the right of the switch 130 and above the switch 160, open tie switches must be identified and closed to connect these sections to adjacent feeders. As discussed below, the present disclosure describes a method for restoration which does not rely on centralized communication and command, and does not require full network topology knowledge by all devices.

At some point in time after the isolating switches 120, 130 and 160 open as shown in FIGS. 3 and 4, this change of status must be communicated to all of the switch devices in the feeder 100, including to the tie switches 220, 340 and 440. In one embodiment of the disclosed method, the process of communicating the new state takes place after the whole event is over, and the ties are closed. At the point in time after the device opening shown in FIG. 4, only the leaders need to know of the isolating switches, and they only need to know about the isolating switch which is still connected to them.

Figure 5:
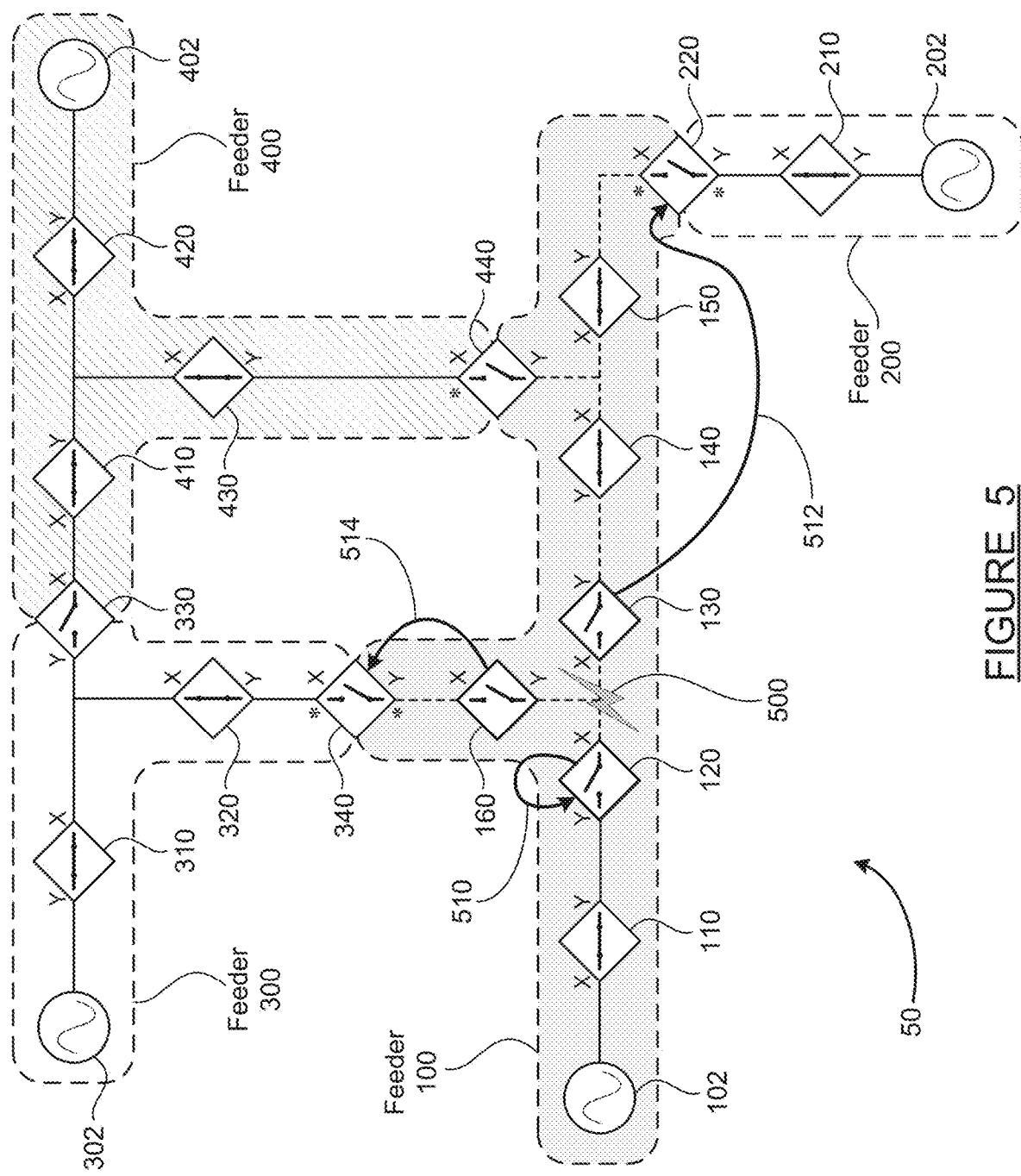
FIG. 5 is a schematic diagram of the group of interconnected feeders, illustrating how the three switches which opened to isolate the fault then identify leader switches and request service restoration, according to an embodiment of the present disclosure.

FIG. 5 is a schematic diagram 50 of the interconnected feeders 100-400, illustrating how the three switches which opened to isolate the fault then identify open ties and request service restoration, according to an embodiment of the present disclosure. In this step, each of the isolating switches 120, 130 and 160 uses its topology list to identify any open ties in the feeder 100 which are located in a direction opposite the fault 500. To perform this step, the switches only need topology information about the feeder which they are part of. Here, the isolating switches make use of the X/Y directional information and the tie leader designations discussed earlier.

The switch 120 knows that the fault 500 is located on its X side, as shown in FIG. 5. The switch 120 therefore looks in its topology list to find an open tie on its Y side. However, the switch 120 does not have an open tie on its Y side, as the source 102 is located in that direction. Thus, the switch 120 determines that there is no open tie other than itself to which a restoration request may be made, as indicated by arrow 510 which loops from the switch 120 back to itself. The arrow 510 looping back to the switch 120 itself does not mean that the switch 120 will re-close as part of the restoration process. As discussed above, the switch 120 is locked out in order to isolate the fault 500 from the source 120, and to protect line workers when the fault 500 is being cleared. The switch 120 will therefore remain open until the fault 500 is cleared and the locked-out isolating switches (120, 130, 160) are re-closed manually by line workers or remotely by human-initiated command.

The switch 130 knows that the fault 500 is located on its X side, and therefore looks in its topology list to find any open ties on its Y side. The switch 130 finds that there are two open ties located in its Y direction—those being the switch 220 which forms a boundary with the feeder 200, and the switch 440 which forms a boundary with the feeder 400. The switch 130 is only allowed to send a restoration request to one open tie, so it must determine the leader for the feeder 100. As discussed earlier, the switch 220 has been identified as the open tie leader for the feeder 100, based on application of the pre-defined rules. The switch 130 therefore sends its restoration request to the open tie switch 220, as indicated by arrow 512. The switch 130 does not send a restoration request to the switch 440.

It is important to understand that only a restoration request is being sent to the open tie 220. Actual tie switch closing is not initiated yet, as further arbitration and authorization must occur before actual restoration of power, which will be discussed below.

The situation of the switch 160 can be handled in one of several ways, according to embodiments of the disclosed method. The switch 160 knows that the fault 500 is located on its Y side, as shown on FIG. 5, and therefore looks in its topology list to find an open tie on its X side. The switch 160 finds that there is one open tie located in its X direction—that being the tie switch 340 which forms a boundary with the feeder 300. However, the switch 340 was not originally the leader of the feeder 100. In one approach of the method, the switch 160, which knows the new topology of the feeder 100, designates the switch 340 as the new leader of the section downstream of the switch 160 (designated by new * on Y side of switch 340), and sends a restoration request to the tie switch 340 as indicated by arrow 514. A second approach is for the switch 160 to send the request to the previously established leader, the switch 220. The switch 220 will then designate the switch 340 as the new leader of the section downstream of the switch 160, based on topology and switch opening information known to the leader switch 220, and forward the restoration request to the switch 340. A third approach is also for the switch 160 to send the request to the switch 220, but then for the switch 220 to determine the restoration outcome for the section downstream of the switch 160, and ask the switch 340 to close without designating it as a leader first. In any case, only a restoration request is sent to the switch 340; actual tie switch closing is not initiated yet.

As mentioned above, the switch 130 identified two open ties to which it could potentially send a restoration request, selected a leader and sent the request to the tie switch 220. Closing of either of the two open ties (220 and 440) downstream of the switch 130 must be coordinated with the other, in order to prevent an undesirable closed circuit between the two sources 202 and 402. It should be noted that the method discussed above is otherwise inherently preventive of restoration requests which would connect two sources, as the isolating switches (120, 130 and 160) which send the requests are open (locked out) and on different branches of the feeder 100, thereby isolating any newly connected adjacent feeders from each other.

Thus far in the process, restoration requests have been sent to open tie switches, but no tie switches have yet been closed. In order to actually restore power to sections of the feeder 100 downstream of the switches 130 and 160, tie switch closing must occur, thereby connecting the affected portions of the feeder 100 to an adjacent feeder and its power source.

Each open tie switch which receives a restoration request must first determine the best way to satisfy the request, and then receive permission from the leader of the adjacent feeder before closing the tie to that adjacent feeder. Recall that the switch 220 received a restoration request from the switch 130. This restoration request could be satisfied by closing the tie switch 220 to the feeder 200, or by closing the tie switch 440 to the feeder 400. The request could even be satisfied by opening the switch 150 and then closing both the tie switches 220 and 440. The best approach may be determined by the leader of the feeder experiencing the fault.

The switch 220 is the leader of the feeder 100. Because the switch 220 is a leader, it has complete device status knowledge for its own feeder. For example, the leader switch 220 knows that the switch 130 opened in order to isolate a fault, that there is currently no power in the feeder 100 downstream of the switch 130, and that a restoration request has been sent by the switch 130.

The leader switch 220 also has limited knowledge of conditions on adjacent feeders, sufficient to enable restoration decision-making. For example, during the information propagation stage (discussed previously with respect to FIG. 1), the switch 440 will share across the devices in the feeder 100 just the additional (excess) capacity available from the feeder 400. The switch 220, upon receiving the restoration request, will not have a full picture (topology and device status) of the feeder 400 since it is not part of that feeder. However, it will know how much capacity is available from the feeder 400, how much capacity is available from the feeder 200, and how much load needs to be picked up downstream of the switch 130. This information is enough for the switch 220 to determine to best way to restore. If the switch 220 determines the best course of action is to close the switch 440, it will ask the switch 440 to close.

Once the tie switch 440 is selected by the leader switch 220 to satisfy the restoration request from the switch 130, the switch 440 must still receive authorization from the feeder 400 leader before actually closing. The switch 440 is the feeder 400 leader, and therefore can provide this authorization itself. Authorization for tie switch closing is only provided when the leader determines that the action will not create an overload situation for the feeder, and that current conditions in the feeder are suitable for tie-in of the adjacent feeder. For example, authorization of the tie switch closing would not be provided if the feeder 400 was currently experiencing a disturbance (fault) of its own, or if the source 402 was compromised in some way.

To summarize the above actions: the tie switch 220 (leader of feeder 100) received a restoration request from the switch 130; the tie switch 220 determined the best way to satisfy the request, using information known to it about topology (open ties which could potentially be closed) and excess capacity on adjacent feeders; the restoration action was assigned by the switch 220 to the tie switch 440; and the tie switch 440 requested and received authorization to close from the feeder 400 leader. Using this approach, the tie switch leader (switch 220) made the restoration decision using pre-defined rules and logic, and information already known to the leader about topology and adjacent feeder capacity. System-wide knowledge of status and topology by all switches is not needed, and system-wide communication to a central controller is not needed.

The tie switch 340 also received a restoration request in FIG. 5. There is no alternative in this case, so the tie switch 340 does not need to determine if it is the best candidate. The tie switch 340 does, however, still need to request authorization from the feeder 300 leader, to determine if an overload condition will be created by its closing, and to ensure that conditions in the feeder 300 are suitable. In this case, closing of the tie switch 340 will only add a small load (customers located between the switch 160 and the switch 340) to the feeder 300, which is not likely to create an overload condition. The open tie switch 340 therefore requests and receives authorization to close from the feeder 300 leader, which is itself.

Figure 6:
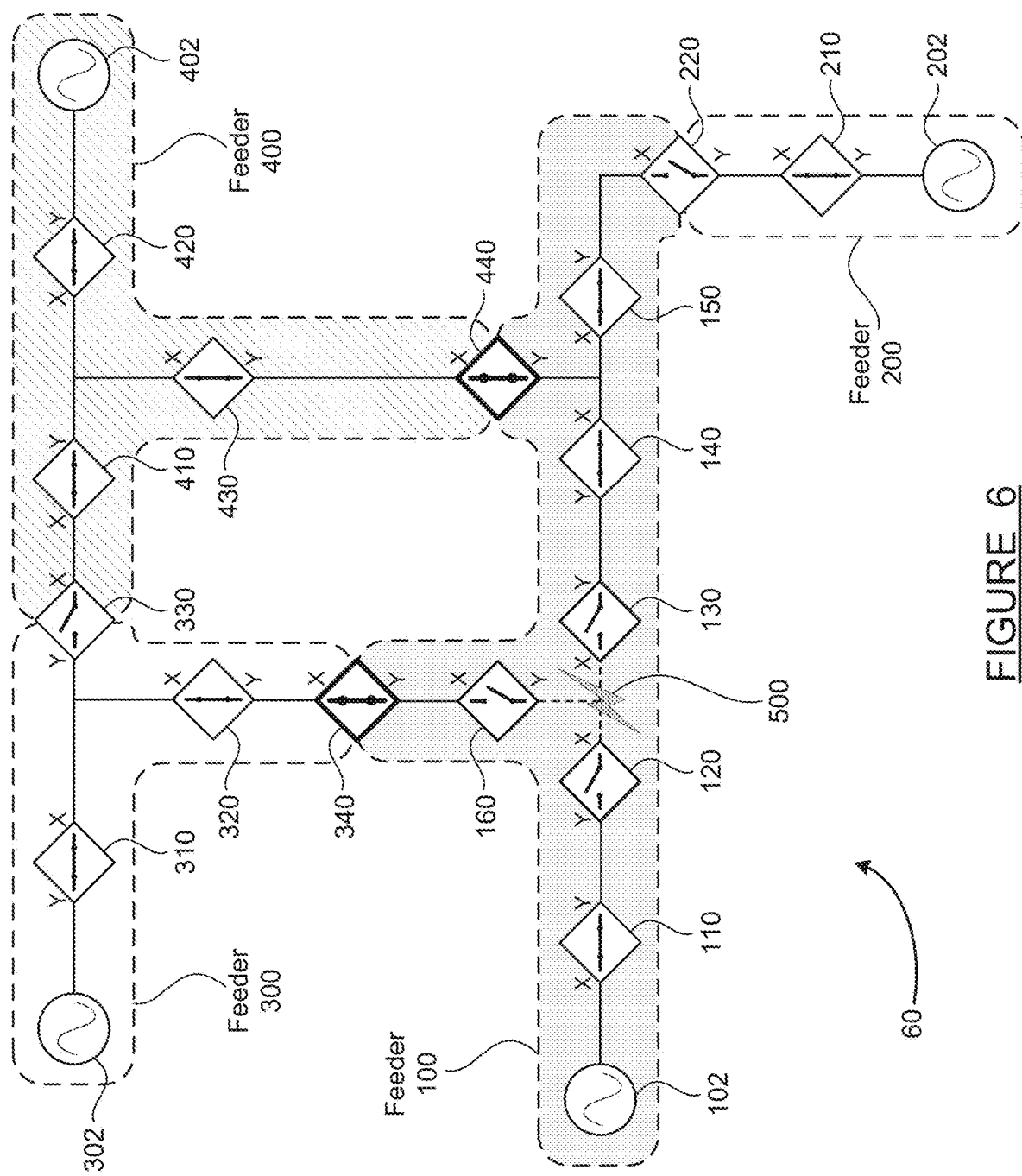
FIG. 6 is a schematic diagram of the group of interconnected feeders in a condition where two normally-open ties have closed in response to the restoration request, according to an embodiment of the present disclosure.

FIG. 6 is a schematic diagram 60 of the interconnected feeders 100-400 in a condition where two normally-open ties have closed in response to the restoration requests, according to an embodiment of the present disclosure. Based on the actions described above in connection with FIG. 5, the open tie switch 440 closed to connect the switches 140 and 150 and their loads to the feeder 400, and the open tie switch 340 closed to connect the switch 160 and its loads to the feeder 300. This new configuration is shown in FIG. 6, where the restored power is indicated by the solid circuit line in the portions of the feeder 100 to the right of the switch 130 and above the switch 160.

When the tie switches 440 and 340 close as shown in FIG. 6, this change of status is communicated to all of the switch devices in the affected feeders. Therefore, the feeder 400 now essentially includes all customers on both sides of the switches 140 and 150, in addition to its own original customers, all powered by the source 402. Using this revised topology list, the same logic described above for FIGS. 2-6 could be employed again in the event of a subsequent fault. For example, if a subsequent fault occurred between the switches 430 and 440, those two switches could be opened to isolate the fault, and the tie switch 220 could be closed for restoration of power to the switches 140 and 150 by connection to the feeder 200.

It is worth mentioning again that all of this FLISR behavior is accomplished based on pre-defined network topology, local current and voltage measurements, pre-programmed behavioral logic at each switch, and communication to leader switches of state changes. No real-time communication from switches to a common controller is required as in centralized FLISR, and system-wide knowledge of all topology is not required as in previous distributed FLISR techniques. Furthermore, the disclosed next-generation distributed FLISR approach is adaptive to changing topology as switches open and close, and therefore able to continue isolation and restoration in the event of multiple faults as discussed above.

The fault isolation and service restoration scenario described above and shown in FIGS. 1-6 is one of the more complex scenarios which may be imagined involving the feeders 100-400, as the feeder 100 has boundaries with three adjacent feeders, and the fault location was at a branch point which involved three neighboring switches for isolation. From the above discussion of this complex scenario, the application of the disclosed techniques to simpler scenarios—with fewer open ties and fewer switch openings required for isolation—can be easily understood.

There are several significant benefits of the disclosed restoration method. One such benefit is better reliability. Under the centralized FLISR scheme, if the central controller stops working or communication channels are inoperable, system restoration stops. Under previous distributed FLISR schemes, if a source switch stops working, rapid self-healing is disabled. Under the new distributed scheme of the present disclosure, all open tie devices would have to stop working to prevent restoration, which would prevent service restoration under any scheme.

Another benefit of the disclosed next-generation distributed FLISR approach is lower communication requirements. Under the centralized FLISR scheme, all of the switch devices need to communicate with the central controller. This can add substantial latency due to the number of hops and/or communication channel congestion problems. Under the new distributed scheme of the present disclosure, only data for the feeder the device is part of needs to be propagated. The feeder topology is not rigid, and it is updated when it changes.

Yet another benefit of the disclosed next-generation distributed FLISR approach is better scalability. Under the centralized FLISR scheme, the central location needs to maintain and compute the entire network. Under the previous distributed scheme, rapid self-healing cannot handle multiple contingencies because the devices' roles are pre-defined. Under the new distributed scheme of the present disclosure, each device only needs to know about its neighboring devices, and roles evolve dynamically based on the system conditions.

Figure 7:
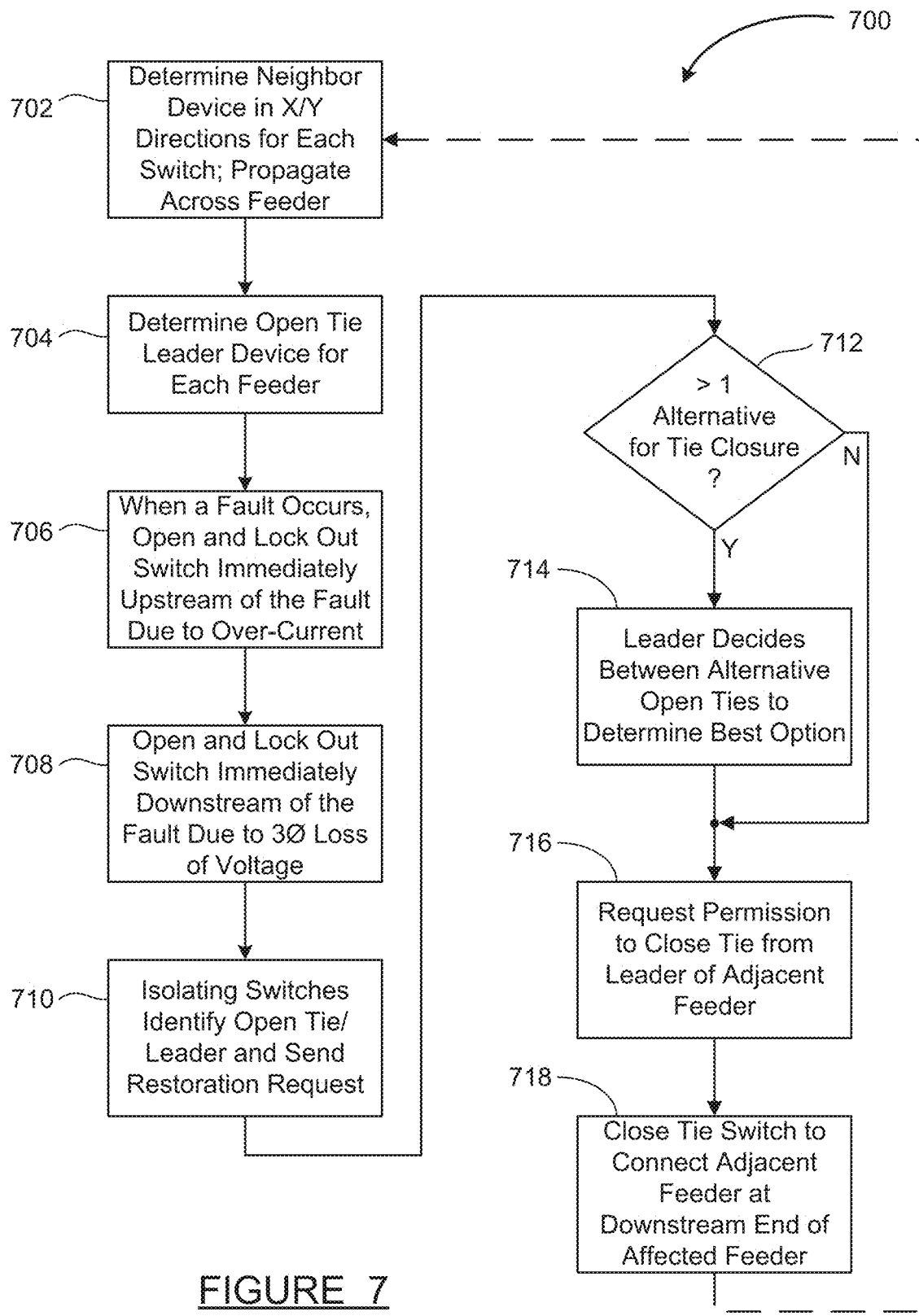
FIG. 7 is a flowchart diagram of a method for fault isolation and service restoration in the group of interconnected feeders, according to embodiments of the present disclosure discussed in relation to FIGS. 1-6.

FIG. 7 is a flowchart diagram 700 of a method for fault isolation and service restoration in a group of interconnected feeders, according to embodiments of the present disclosure discussed above in relation to FIGS. 1-6. At box 702, each switch device determines its neighbor or neighbors in both the X and Y directions. This determination can be made via switch-to-switch communication, or by manual definition when each feeder is installed or modified. Information about each switch's X and Y neighbors is propagated via switch-to-switch communication throughout the entire feeder, so that all devices in each feeder—including the open ties at the boundaries with adjacent feeders—have a complete topology list for the feeder(s) to which they belong. Limited information—such as available excess capacity—from adjacent feeders is also propagated via switch-to-switch communication throughout each feeder at the box 702.

At box 704, an open tie leader is determined for each feeder in the group of interconnected feeders. The leader is determined based on the pre-defined rules for leader selection, which may include consideration of the location of each open tie within the feeder, the RTU number of the open ties, the computing or load-carrying capacity of each open tie, and/or other factors. At the box 704, the open tie leader device is selected by applying those rules to the nominal conditions and configuration of each feeder.

At box 706, when a fault occurs (FIG. 2), a switch immediately upstream of the fault (nearer the source) opens and locks out due to its over-current protection characteristics. This was shown in FIG. 3, where the switch 120 opened to isolate the fault 500 from the source 102, thereby restoring power to the sections of the feeder 100 upstream of the switch 120. At box 708, the switch or switches immediately downstream of the fault open and lock out due to their detection of a loss of voltage on all three phases. This action was shown in FIG. 4. The switches in the feeder may also pass messages—such as the switch 120 sending a message indicating it has locked out (opened) due to an over-current situation, whereupon the switches 130 and 160 know from the topology list that they are the neighbors of the switch 120 and that they must therefore lock out (open) in order to isolate the fault 500.

At box 710, each isolating switch identifies open ties in the direction opposite of the fault, from information in the topology list, and sends a restoration requests to one of those open ties. This action was shown in FIG. 5. In many cases, there will be two isolating switches—one upstream and one downstream of the fault. However, in the case of the fault 500, which is located at a branch point, there are three isolating switches. The switch 120, upstream of the fault, does not have an open tie in a direction opposite the fault, and has already had service restored upstream of itself directly from the source 102, and therefore the switch 120 identifies itself as the open tie and sends a message to itself. Even though it sends a restoration request to itself, the switch 120 will not re-close because it is locked out for fault isolation.

The switch 130 determines there are two open ties in its Y direction and therefore must identify the open tie leader device among those two open ties. The isolating switch 130 identifies the open tie switch 220 as the leader for the feeder 100, and then sends a restoration request to the switch 220. The switch 160 determines there is only one open tie in its X direction, that being the tie switch 340, and therefore sends a restoration request to the switch 340.

At decision diamond 712, each open tie which receives a restoration request determines, from the topology list for the fault-affected feeder, whether any other alternative open ties exist for the portion of the affected feeder needing restoration. The switch 220, which received a restoration request, determines that the switch 440 is an alternative for restoration of the affected portions of the feeder 100. Therefore, at box 714, the switch 220 decides between the alternative open ties (220 and 440) to determine the best option. As discussed earlier, the decision may include consideration of which adjacent feeder has the most excess capacity, consideration of the current status of each potential adjacent feeder (do any of them currently have faults and open isolating switches?), and other factors. In the case of FIG. 5, the decision by the leader switch 220 identifies the open tie switch 440 as the best alternative, and therefore the restoration (closing) request is sent to the switch 440.

At the decision diamond 712, the open tie 340, which received a restoration request from the switch 160, determines that no alternative exists, and skips over the decision step at the box 714.

At box 716, open tie switches (which are selected for restoration) request permission for closing from the leader of the adjacent feeder to which they belong. Permission from the leader of the adjacent feeder is a different step than decision between alternatives. This permission request happens either after deciding between alternative open ties at the box 714, or after determining that no alternatives exist at the decision diamond 712. In FIG. 5, as discussed above, the switch 220 identified the open tie switch 440 as the best alternative, and there was no alternative for the open tie switch 340. Therefore, the open tie switch 440 must request permission to close from the leader of the feeder 400, which is itself. Likewise, the open tie switch 340 must request permission to close from the leader of the feeder 300, which is itself.

Before the open tie switches 340 and 440 are authorized to close at the box 716, their leaders must first confirm that the condition of the adjacent feeder is suitable for taking on extra load from the feeder 100. That is, the open tie leaders 340 and 440 confirm at the box 716 that the feeders 300 and 400 are in good condition (no faults in the process of being isolated) and there are no problems with the sources 302 and 402 which would prevent them from taking on the extra load from the feeder 100. If adjacent feeder conditions are suitable, then permission to close is granted at the box 716.

At box 718, the open tie switches which have been selected and confirmed for restoration actually close. When these tie switches close, power is restored to downstream portions of the affected feeder. This action was shown in FIG. 6, where the tie switch 440 closed to restore power to the right of the switch 130 in the feeder 100, and the tie switch 340 closed to restore power above the switch 160 in the feeder 100.

The process described in the flowchart diagram 700 isolates the fault 500 and restores service to portions of the feeder 100 downstream of the fault using only local information and measurements, and communication only within each individual feeder.

After the box 718, the fault 500 is isolated and power has been restored to all downstream sections of the feeder 100. The process then returns to the box 702—to redefine the topology of the switches and the leader devices after recovering from a fault (to prepare for a possible subsequent fault, which could also be recovered from with only local in-feeder topology knowledge). This redefinition of the topology is easily accomplished in the manner discussed previously. For example, in FIG. 6, the switch 440 is now closed, and the feeder 400 now includes the switches 140 and 150. Meanwhile, the feeder 200 is unaffected by changes resulting from the fault 500 in the feeder 100.

As will be well understood by those skilled in the art, the several and various steps and processes discussed herein to describe the disclosed methods may be referring to operations performed by a computer, a processor or other electronic calculating device that manipulates and/or transforms data using electrical phenomenon. In particular, this refers to the control calculations and operations performed by controllers or processors included in each of the switches in the feeders of FIGS. 1-6. Those processors and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The disclosed methods for fault location, isolation and service restoration without knowledge of adjacent feeder topology provide a means for implementing FLISR which is simpler to implement and offers more flexibility in responding to distribution grid faults. Using these methods, FLISR implementations are more reliable and adaptable to changing conditions, which provides significant benefit to electrical power distribution companies, and to all consumers on the grid.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for providing fault location, isolation and service restoration for a group of interconnected feeders in a distribution grid, the method comprising:
   providing, to all switches in each individual feeder in the group of interconnected feeders, a feeder topology list defining connectivity of the switches in the individual feeder, wherein each switch includes a controller and associated memory, the memory be at least configured to receive and maintain the feeder topology list once provided;
   determining an open tie switch leader for each of the individual feeders dynamically and a priori a fault, wherein the memory is further configured to receive and maintain open tie switch leader designation information;
   opening one or more normally-closed switches in a fault-affected feeder when the fault occurs in order to isolate the fault;
   sending a restoration request, by the one or more normally-closed switches which opened, to an open tie switch in the fault-affected feeder which is located in a direction opposite the fault and which forms a boundary with an adjacent feeder;
   requesting permission to close from the open tie switch leader of the adjacent feeder by each of the open tie switches which receives a restoration request; and
   closing each of the open tie switches, when permission is received from the open tie switch leader, to restore power to a downstream section of the fault-affected feeder.

2. The method according to claim 1 wherein providing the feeder topology list includes each switch identifying its neighbors and propagating neighbor information from each switch to all switches in the individual feeder.

3. The method according to claim 1 wherein the feeder topology list includes, for each switch in the individual feeder, identification of one or two immediate neighbor switches in each of an X direction and a Y direction.

4. The method according to claim 1 wherein the feeder topology list for each individual feeder includes normally-closed switches and normally-open tie switches forming a boundary with an adjacent feeder.

5. The method according to claim 1 wherein determining an open tie switch leader for each of the individual feeders includes evaluating a pre-defined set of criteria, where the criteria include one or more of; a remote terminal unit (RTU) number of each open tie switch in the individual feeder, a physical location of each open tie switch in the individual feeder, and a load-carrying capacity of each open tie switch in the individual feeder.

6. The method according to claim 1 wherein opening one or more normally-closed switches in a fault-affected feeder when a fault occurs includes opening a switch immediately upstream of the fault in order to isolate the fault from a feeder source and opening one or more switches immediately downstream of the fault in order to isolate the fault from the downstream section.

7. The method according to claim 6 wherein the switch immediately upstream of the fault opens based on a measured current and time-current protection characteristic defined for each of the switches.

8. The method according to claim 6 wherein the one or more switches immediately downstream of the fault open based on a communication received from the switch immediately upstream of the fault which opened.

9. The method according to claim 1 wherein sending the restoration request includes identifying one or more open tie switches located in a direction opposite the fault in the fault-affected feeder and, when more than one open tie switch is identified, selecting the open tie switch leader of the fault-affected feeder.

10. The method according to claim 9 wherein, when more than one open tie switch is identified, the open tie switch leader determines which open tie switch or switches should close based on available excess capacity information about adjacent feeders.

11. The method according to claim 1 further comprising providing permission to close from the open tie switch leader of the adjacent feeder when conditions of the adjacent feeder are confirmed as acceptable, including determining that an over-capacity situation will not be created by closing the open tie switch, and determining that the adjacent feeder is not currently responding to a different fault.

12. The method according to claim 1 wherein each switch in each of the individual feeders includes current and voltage sensors, a processor with memory in communication with the sensors, a switch-to-switch communication module, and an actuator configured to open or close the switch upon receiving a command from the processor.

13. The method according to claim 1 further comprising redefining the feeder topology list and the open tie switch leader for each of the individual feeders, after closing each of the open tie switches.

14. The method according to claim 13 further comprising repeating the method for fault location, isolation and service restoration, based on the feeder topology lists and open tie switch leaders after redefining, when a subsequent fault occurs.

15. A method for providing fault location, isolation and service restoration for a group of interconnected feeders in a distribution grid, the method comprising:
  providing, to all switches in each individual feeder in the group of interconnected feeders, a feeder topology list defining connectivity of the switches in the individual feeder, including each switch identifying its neighbors in each direction and propagating neighbor information from each switch to all switches in the individual feeder, wherein each switch includes a controller and associated memory, the memory be at least configured to receive and maintain the feeder topology list once provided;
  determining an open tie switch leader for each of the individual feeders a priori a fault, wherein the memory is further configured to receive and maintain open tie switch leader designation information;
  opening one or more normally-closed switches in a fault-affected feeder when a fault occurs in order to isolate the fault, including opening a switch immediately upstream of the fault in order to isolate the fault from a feeder source, and opening one or more switches immediately downstream of the fault in order to isolate the fault from the downstream section;
  sending a restoration request, by the one or more normally-closed switches which opened, to the open tie switch leader in the fault-affected feeder which is located in a direction opposite the fault;
  selecting which open tie switch should be closed in response to the restoration request, by the open tie switch leader when more than one alternative exists;
  requesting permission to close from the open tie switch leader of the adjacent feeder by each of the open tie switches which receives a restoration request and is selected to close;
  providing permission to close from the open tie switch leader of the adjacent feeder when conditions of the adjacent feeder are confirmed as acceptable, including determining that the adjacent feeder is not currently responding to a different fault; and
  closing each of the open tie switches, when permission is received, to restore power to a downstream section of the fault-affected feeder.

16. The method according to claim 15 further comprising redefining the feeder topology list and the open tie switch leader for each of the individual feeders, after closing each of the open tie switches.

17. A system of interconnected distribution grid feeders providing fault location, isolation and service restoration, the system comprising:
  a plurality of interconnected feeders, each feeder comprising a power source at an upstream end of the feeder, one or more normally-closed switches, and one or more open tie switches at a boundary with an adjacent one of the plurality of interconnected feeders,
  where the normally-closed switches and the open tie switches each include current and voltage sensors, a processor with memory receiving signals from the sensors, a switch-to-switch communication module, and an actuator configured to open or close the switch upon a command from the processor,
  and where the processor on each switch is pre-configured with an algorithm to provide a feeder topology list to all switches in each individual feeder defining connectivity of the switches in the individual feeder, determine an open tie switch leader for each of the individual feeders, open one or more of the normally-closed switches in a fault-affected feeder when a fault occurs in order to isolate the fault, send a restoration request by the one or more normally-closed switches which opened to an open tie switch in the fault-affected feeder which is located in a direction opposite the fault, request permission to close from the open tie switch leader of the adjacent feeder by each of the open tie switches which receives a restoration request, and close each of the open tie switches when permission is received to restore power to a downstream section of the fault-affected feeder.

18. The system according to claim 17 wherein providing the feeder topology list includes each switch identifying its immediate neighbor switches in each of an X direction and a Y direction and propagating neighbor information from each switch to all switches in the individual feeder.

19. The system according to claim 17 wherein determining an open tie switch leader for each of the individual feeders includes evaluating a pre-defined set of criteria, where the criteria include one or more of; a remote terminal unit (RTU) number of each open tie switch in the individual feeder, a physical location of each open tie switch in the individual feeder, and a load-carrying capacity of each open tie switch in the individual feeder.

20. The system according to claim 17 wherein sending the restoration request includes identifying one or more open tie switches located in a direction opposite the fault in the fault-affected feeder and, when more than one open tie switch is identified, selecting the open tie switch leader of the fault-affected feeder when the leader is one of the open tie switches identified.

* * * * *